United States Patent [19]
Gautier et al.

[11] Patent Number: 5,487,271
[45] Date of Patent: Jan. 30, 1996

[54] BRAKE-BOOSTER WITH HYDRAULIC REACTION AND ADJUSTABLE KICK

[75] Inventors: Jean Pierre Gautier; Ulysse Verbo, both of Aulnay-sous-Bois; Miguel Perez Revilla, Argenteuil, all of France

[73] Assignee: AlliedSignal Europe Services Techniques, Drancy, France

[21] Appl. No.: 117,148

[22] Filed: Sep. 13, 1993

[30] Foreign Application Priority Data

Sep. 30, 1992 [FR] France .................... 92 11624

[51] Int. Cl.⁶ .................... B60T 13/20; F15B 9/10
[52] U.S. Cl. .................... 60/554; 60/547.1; 91/376 R
[58] Field of Search .................... 60/554, 547.1, 60/548, 550, 552, 555; 91/369.2, 376 R, 369.1; 92/48, 96, 98 R

[56] References Cited

U.S. PATENT DOCUMENTS

| | | | |
|---|---|---|---|
| 3,076,315 | 2/1963 | Hager | 60/555 |
| 3,183,789 | 5/1965 | Stelzer | 60/552 X |
| 4,417,445 | 11/1983 | Furuta | 60/554 |
| 4,667,567 | 5/1987 | Morimoto | 91/376 R |
| 4,738,108 | 4/1988 | Kobayashi et al. | 60/547.1 |
| 5,136,927 | 8/1992 | Rossigno et al. | 91/376 R X |
| 5,305,606 | 4/1994 | Schonlau et al. | 60/547.1 |

FOREIGN PATENT DOCUMENTS

| | | |
|---|---|---|
| 2317533 | 2/1977 | France . |
| 2558126 | 7/1985 | France . |

*Primary Examiner*—Edward K. Look
*Assistant Examiner*—Hoang Nguyen
*Attorney, Agent, or Firm*—Larry J. Palguta; Leo H. McCormick, Jr.

[57] ABSTRACT

This brake-booster device comprises a pneumatic brake-booster (1) associated with a master cylinder (2). The booster comprises a movable pneumatic piston (5) bearing a valve (7) and functions according to a hydraulic reaction principle, the hydraulic piston (11) of the master cylinder comprising in fact a hollow movable cylinder (13) receiving a boost force, and a secondary hydraulic piston receiving an input force, these two forces constituting the total actuation force. A helical spring (22), exerting an adjustable resilient force, is disposed between the secondary hydraulic piston and the movable cylinder so as to permit the adjustment of the non-zero minimal value of the actuation force.

4 Claims, 1 Drawing Sheet

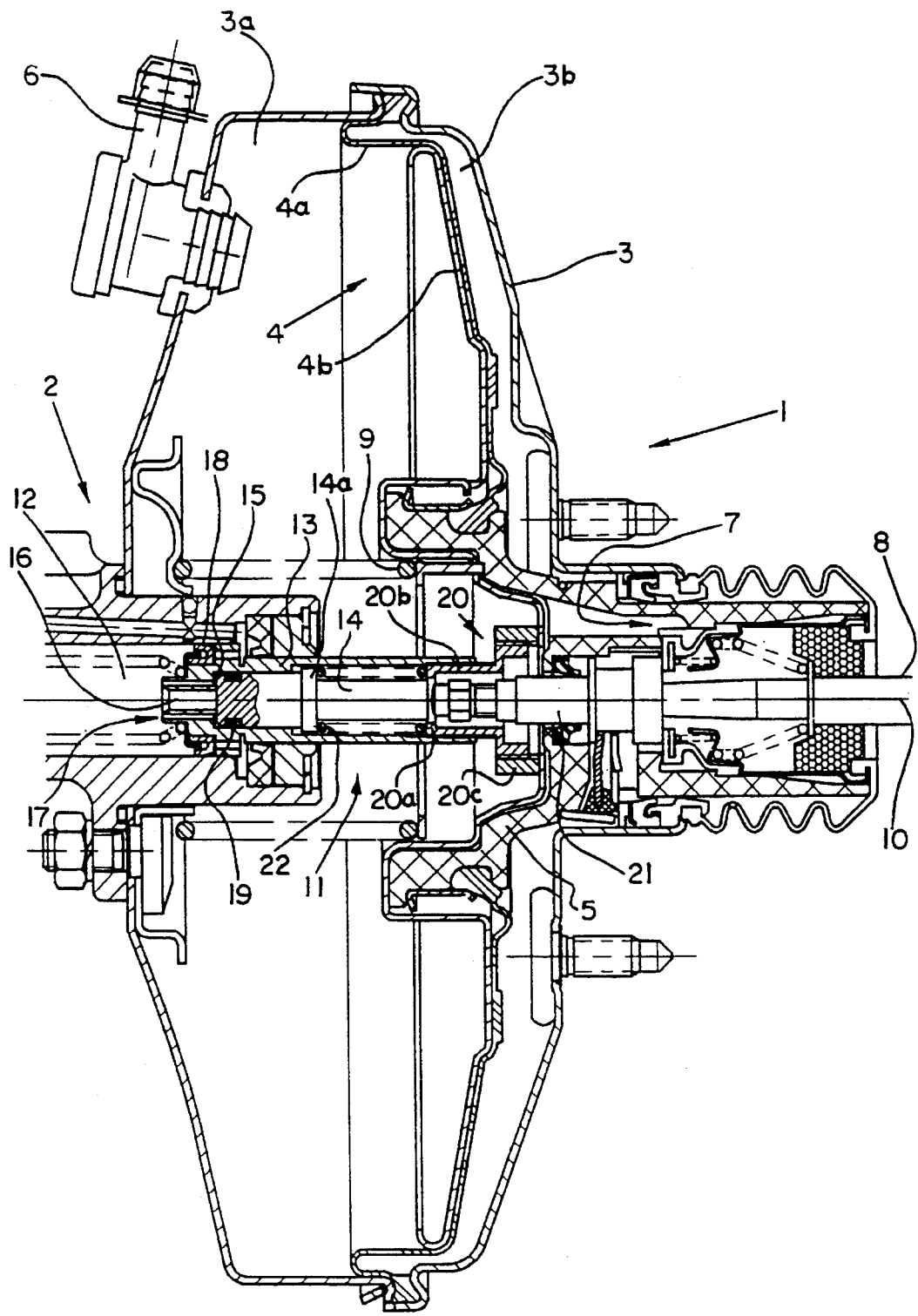

BRAKE-BOOSTER WITH HYDRAULIC
REACTION AND ADJUSTABLE KICK

The present invention relates to a brake-booster device for a motor vehicle, comprising on the one hand a master cylinder filled with a brake fluid and fitted with a main hydraulic piston designed to receive an actuation force composed of an input force and of a boost force both acting in an axial direction, and on the other hand a pneumatic booster capable of being controlled by application of said input force on a control rod controlling the opening of a valve, so as to exert said actuation force on the main hydraulic piston, the booster comprising a rigid casing separated in leaktight manner into two chambers by means at least of a movable partition, capable of being acted upon by a pressure differential between the two chambers resulting from the opening of the valve and of driving a pneumatic piston, movable with respect to the casing, bearing said valve and contributing at least to transmission of said boost force.

A device of this type is well known in the prior art and is, for example, described in U.S. Pat. No. 4,491,058.

Such a braking device has the advantage, resulting from the use of a pneumatic piston movable with respect to the rigid casing, that the total travel available for the control rod, therefore for the brake pedal, is relatively long, which constitutes a condition necessary in order to ensure the optimal control of the deceleration of the vehicle when braking.

One difficulty conventionally encountered in devices of this type, due in particular to the relative movements of the various parts, concerns the adjustment of a functional parameter known to the person skilled in the art by the term "kick".

This term refers to the non-zero minimal value which the actuation force assumes abruptly when the control rod has been displaced sufficiently from its resting position.

U.S. Pat. No. 4,984,506 describes for example a process for adjusting the kick in a brake-booster device using a resilient reaction disk, of the type described in U.S. Pat. No. 4,491,058.

Despite its advantage and its effectiveness, this known technique nevertheless suffers from a residual defect, resulting from the fact that the adjustment leads to a prestress of this disk.

In fact, not only can this prestress constitute a cause of premature wear of the reaction disk, requiring an operation on the booster, but it also causes to appear a thrust force which acts as a parasitic term in the value of the kick per se.

In this context, the object of the present invention is to provide a brake-booster device of the abovementioned type in which the adjustment of the kick is as simple as possible and nevertheless devoid of undesirable secondary effects.

To this end, the device of the present invention is essentially characterized in that the main hydraulic piston of the master cylinder comprises per sea hollow, movable cylinder, communicating with the master cylinder, receiving at least part of the boost force, and inside which slides, in leaktight manner and in the axial direction, a secondary hydraulic piston capable of receiving at least said input force, and in that resilient means, exerting an adjustable resilient force between said secondary hydraulic piston and said movable cylinder, are disposed inside the latter and push said secondary hydraulic piston in the direction of the master cylinder, the adjustment of said resilient force enabling adjustment of the non-zero minimal value of the actuation force.

Although the use of a movable cylinder and of a secondary piston to constitute the hydraulic piston of the master-cylinder is already disclosed in the patent application FR-A-2 317 533, this prior document relates in fact to a booster, the valve of which is fixed with regard to the casing, i.e. not supported by a movable piston, whereby the travel of the brake pedal of such a booster, at least in the first working phase thereof, is very short as indicated in the second paragraph of page 5 of patent application FR-A-2 317 533.

The resilient means in question comprise for example a helical spring captive between an annular step of the secondary hydraulic piston and a threaded bush screwed into the movable cylinder, this bush transmitting to the movable cylinder the boost force coming from the movable partition, the input force being transmitted to said secondary hydraulic piston by means of a thrust rod of adjustable length.

Preferably, the threaded bush is in addition constructed in two parts, the one screwed into the other, so as to have per se an adjustable total length.

The invention will now be described by way of example with reference to the accompanying single FIGURE which is a view in partial cross-section of a device according to the invention.

Insofar as the invention relates only to an improvement made to pneumatic brake-booster systems, and insofar as the general constitution and the functioning of the latter are well known to the person skilled in the art, these systems will be rapidly recalled here only in order to provide a total understanding of the improvement which the invention represents.

BRIEF DESCRIPTION OF THE DRAWING

The only FIGURE in this application discloses an improvement of a pneumatic booster and master cylinder apparatus having a hydraulic reaction and adjustable kick.

DETAILED DESCRIPTION OF THE DRAWING

Diagrammatically, a system of this type comprises a booster 1 and a master cylinder 2.

The booster per se comprises a rigid casing 3 separated into two chambers 3a and 3b, in leaktight manner, by a movable partition 4 comprising a membrane 4a and a rigid skirt 4b and capable of driving a pneumatic piston 5 movable inside the casing 3.

The front chamber 3a, the front face of which is closed in leaktight manner by the master cylinder 2, is permanently connected to a partial vacuum source (not shown) through a union 6.

The pressure in the back chamber 3b is controlled by a valve 7, controlled by a control rod 8, which is connected to a brake pedal (not shown).

When the control rod 8 is in resting position, in this case pulled to the right, the valve 7 establishes a communication between the two chambers 3a and 3b of the booster.

The back chamber 3b then being subject to the same partial vacuum as the front chamber 3a, the piston 5 is pushed back to the right, into resting position, by a spring 9.

The actuation of the control rod 8 towards the left has the effect, in a first stage, of moving the valve 7 so that it isolates from one another the chambers 3a and 3b and then, in a second stage, of moving this valve so that it opens the back chamber 3b to atmospheric pressure.

The pressure differential between the two chambers then sensed by the membrane 4a exerts on the movable partition 4 a thrust which tends to move it towards the left and to permit it to drive the piston 5 which moves in turn compressing the spring 9.

The braking effort exerted on the control rod 8, or "input force", and the brake boosting effort, or "boost force", resulting from the thrust of the movable partition 4 are then applied together along the axis 10 of the thrust rod 8 in the direction of the master cylinder 2, and combine to constitute the actuation force of the latter.

More precisely, the actuation force is applied on the main hydraulic piston 11 of the master cylinder and produces the movement thereof towards the left (in the figure), which leads to a raising of pressure of the brake fluid present in the internal volume 12 of the master cylinder, and an actuation of the brake connected to the latter.

The main hydraulic piston 11 is in fact composite and comprises on the one hand a movable and hollow cylinder 13, and on the other hand a secondary hydraulic piston 14.

The internal volume 15 of the movable cylinder 13 communicates with the internal volume 12 of the master cylinder through the intermediary of apertures, such as 16 and 17, made in the movable cylinder in an axial direction.

Apart from the passage of fluid which these apertures 16 and 17 permit between the internal volume 12 of the master cylinder 2 and that of the movable cylinder 13, this movable cylinder 13 slides in leaktight manner in the master cylinder 2, the leaktightness being obtained by virtue at least of an annular seal 18.

The secondary hydraulic piston 14, for its part, slides inside the movable cylinder 13, which it closes in leaktight manner by virtue of an annular seal 19.

The movable cylinder 13 is connected, through the bush 20, to the rigid skirt 4b so as to receive at least part of the boost force exerted through the intermediary of this skirt.

The secondary hydraulic piston 14 is disposed axially, facing a thrust rod 21 capable of transmitting to it at least the input force exerted on the control rod 8.

The functioning of the device described hitherto is as follows.

When an input force is applied on the control rod 8, the secondary hydraulic piston 14 is pushed to the left, carrying with it the movable cylinder 13 inside which it is stopped.

After a predetermined travel of the thrust rod 8, the valve 7 opens to the atmosphere the back chamber 3b of the booster, previously isolated from the front chamber 3a, and a boost force is applied to the movable cylinder 13 by the rigid skirt 4b through the bush 20.

The hydraulic pressure in the internal volume 12 of the master cylinder rises and becomes established, by circulation of hydraulic fluid through the apertures 16 and 17, in the internal volume 15 of the movable cylinder, thus causing to appear, on the secondary hydraulic piston 14, a reaction force dependent on the boost force, opposing the input force, and therefore permitting the control of the first force by the second.

In practice, however, not only does the actuation force not appear until after a non-zero travel of the control rod 8, resulting from the necessity to take up all of the constructional clearances and to move the valve 7 in order to open it, but in addition it abruptly assumes, when it appears, a non-zero value termed "kick" the adjustment of which, which is very desirable, constitutes the essential object of the invention.

To this end, a helical spring 22, of adjustable length, is disposed in the movable cylinder 13 bearing against an annular step 14a of the secondary hydraulic piston 14, so as to exert on the latter an adjustable resilient force directed towards the master cylinder 2, that is to say towards the left in the FIGURE.

For example, as this FIGURE shows, the helical spring 22 is captive between the annular step 14a of the piston 14 and the axial end 20a of a bush 20, this bush being threaded and screwed into the movable cylinder 13 to which it transmits at least part of the boost force exerted on the skirt 4b bearing against it.

The screwing of the bush 20 into the movable cylinder 13 thus has the effect of compressing the spring 22, therefore of increasing the resilient force which the latter exerts on the secondary hydraulic piston 14 in the direction of the master cylinder, that is to say in turn of increasing the value of the kick.

In order to compensate for the reduction in length resulting from the screwing of the bush 20 into the movable cylinder 13, this bush is for example constructed in two parts 20b, 20c, the one screwed into the other, so as to have an adjustable total length.

Moreover, the thrust rod 21 per se is preferably constructed in two parts, the one screwed into the other, so as to have an adjustable total length, the adjustment of this length making it possible in particular to modify the aperture of the valve at the appearance of the kick, whatever the value given to the latter by screwing the bush 20 into the movable cylinder 13.

We claim:

1. A brake-booster device for a motor vehicle, comprising a master cylinder having with a main hydraulic piston designed to receive an actuation force composed of an input force and of a boost force both acting in an axial direction, and a pneumatic booster controllable by application of said input force on a control rod controlling the opening of a valve, so as to exert said actuation force on the main hydraulic piston, the booster comprising a rigid casing separated in leaktight manner into two chambers by means at least of a movable partition capable of being acted upon by a pressure differential between the two chambers resulting from the opening of the valve and of driving a pneumatic piston, movable with respect to the casing, bearing said valve and contributing at least to transmission of said boost force, characterized in that the main hydraulic piston of the master cylinder comprises a hollow, movable cylinder communicating with the master cylinder, receiving at least part of the boost force, and inside which slides, in leaktight manner and in the axial direction, a secondary hydraulic piston capable of receiving at least said input force, and in that resilient means, exerting an adjustable resilient force between said secondary hydraulic piston and said movable cylinder, is disposed inside the movable cylinder and pushes said secondary hydraulic piston in the direction of the master cylinder, the adjustment of said resilient force enabling adjustment of a non-zero minimal value of the actuation force.

2. The device according to claim 1, characterized in that said resilient means comprise a helical spring captive between an annular step of the secondary hydraulic piston and a threaded bush screwed into the movable cylinder, the bush transmitting to the movable cylinder the boost force from the movable partition.

3. The device according to claim 2, characterized in that the input force is transmitted to said secondary hydraulic piston by means of a thrust rod of adjustable length.

4. The device according to claim 2 or 3, characterized in that the threaded bush is constructed in two parts, one part screwed into the other part, to have an adjustable total length.

\* \* \* \* \*